(12) United States Patent
Anastasyev et al.

(10) Patent No.: US 11,967,319 B2
(45) Date of Patent: Apr. 23, 2024

(54) METHOD AND ELECTRONIC DEVICE FOR PROCESSING A SPOKEN UTTERANCE

(71) Applicant: YANDEX EUROPE AG, Lucerne (CH)

(72) Inventors: Daniil Garrievich Anastasyev, Troitsk (RU); Boris Andreevich Samoylov, Moscow (RU); Vyacheslav Vyacheslavovich Alipov, Tomsk (RU)

(73) Assignee: Direct Cursus Technology L.L.C, Dubai (AE)

(*) Notice: Subject to any disclaimer, the term of this patent is extended or adjusted under 35 U.S.C. 154(b) by 304 days.

(21) Appl. No.: 17/392,635

(22) Filed: Aug. 3, 2021

(65) Prior Publication Data
US 2022/0199076 A1  Jun. 23, 2022

(30) Foreign Application Priority Data

Dec. 22, 2020 (RU) .......................... RU2020142449

(51) Int. Cl.
G10L 15/22 (2006.01)
G10L 15/26 (2006.01)
G10L 25/30 (2013.01)

(52) U.S. Cl.
CPC .............. *G10L 15/22* (2013.01); *G10L 15/26* (2013.01); *G10L 25/30* (2013.01); *G10L 2015/223* (2013.01)

(58) Field of Classification Search
None
See application file for complete search history.

(56) References Cited

U.S. PATENT DOCUMENTS 9,037,967 B1 * 5/2015 Al-Jefri ................. G06F 40/232
                                                    715/257
11,314,811 B1 * 4/2022 Hume ................... G10L 15/193
(Continued)

FOREIGN PATENT DOCUMENTS

| EP | 1001406 B1 | 12/2004 |
| RU | 2616553 C2 | 4/2017 |
| WO | 2019172946 A | 9/2019 |

OTHER PUBLICATIONS

Nuri, "Neural Logic Framework for Digital Assistants", Jun. 16, 2017, MEng Individual Project, Imperial College London, Department of Computing, https://www.imperial.ac.uk/media/imperial-college/faculty-of-engineering/computing/public/1617-ug-projects/Nuri-Cingillioglu---Neural-Logic-Framework-for-Digital-Assistants.pdf, 131 pages.

(Continued)

*Primary Examiner* — Seong-Ah A Shin
(74) *Attorney, Agent, or Firm* — BCF LLP

(57) ABSTRACT

Methods and electronic devices for processing a spoken utterance associated with a user of an electronic device are disclosed. The method includes generating a textual representation of the spoken utterance having words, identifying a nonce word and a non-normalized word amongst the words, and generating a plurality of candidate textual representations based on the textual representation. The candidates have at least one of a first set of candidate textual representations and a second set of candidate textual representations, such that candidates from the first set are missing the nonce word from the words of the textual representation, and candidates from the second set have the non-normalized word from the words of the textual representation replaced by a normalized version thereof. The method includes (Continued)

comparing the candidates against grammars, and in response to a match, triggering an action associated with the grammar.

20 Claims, 4 Drawing Sheets

(56) References Cited

U.S. PATENT DOCUMENTS

| | | | |
|---|---|---|---|
| 11,580,145 B1* | 2/2023 | Kumar | G06N 3/092 |
| 2007/0250317 A1* | 10/2007 | Davis | G10L 15/26 |
| | | | 704/235 |
| 2010/0324901 A1* | 12/2010 | Carter | G10L 15/065 |
| | | | 704/255 |
| 2015/0255069 A1* | 9/2015 | Adams | G10L 15/08 |
| | | | 704/236 |
| 2017/0263249 A1* | 9/2017 | Akbacak | G06F 21/00 |
| 2018/0089572 A1* | 3/2018 | Aili | G06F 9/453 |
| 2019/0325864 A1* | 10/2019 | Anders | G06F 3/167 |
| 2022/0148592 A1* | 5/2022 | Maury | G10L 15/22 |

OTHER PUBLICATIONS

Alexa Skills Kit https://github.com/alexa/alexa-skills-kit-sdk-for-java, retrieved from the Internet on Jul. 30, 2021.
Luis (Microsoft) https://docs.microsoft.com/en-us/azure/cognitive-services/luis/what-is-luis, retrieved from the Internet on Aug. 3, 2021.
Cortana SDK, https://en.wikipedia.org/wiki/Cortana, retrieved from the Internet on Aug. 2, 2021.
Russian Search Report dated Jun. 9, 2022 issued in respect of the counterpart Russian Patent Application No. RU 2020142449.

* cited by examiner

METHOD AND ELECTRONIC DEVICE FOR PROCESSING A SPOKEN UTTERANCE

CROSS-REFERENCE

The present application claims priority to Russian Patent Application No. 2020142449, entitled "Method and Electronic Device for Processing a Spoken Utterance", filed Dec. 22, 2020, the entirety of which is incorporated herein by reference.

FIELD

The present technology relates to intelligent personal assistant systems and, more particularly, to methods and electronic devices for processing a spoken utterance.

BACKGROUND

Electronic devices, such as smartphones and tablets, are able to access an increasing and diverse number of applications and services for processing and/or accessing different types of information.

However, novice users and/or impaired users and/or users operating a vehicle may not be able to effectively interface with such devices mainly due to the variety of functions provided by these devices or the inability to use the machine-user interfaces provided by such devices (such as a keyboard). For example, a user who is driving or a user who is visually-impaired may not be able to use the touch screen keyboard associated with some of these devices. In addition to the above situations where the user is not able to effectively interact with a device via touch-based interfaces, a plethora of "hands-free" devices are appearing on the market which are controllable via voice-based commands.

Intelligent Personal Assistant (IPA) systems are implemented on some devices and have been developed to perform tasks in response to user voice-based commands. For example, IPA systems may be used for information retrieval and/or navigation purposes. A conventional IPA system, such as Siri® IPA system for example, can receive a digital audio signal containing a user utterance and perform a large variety of tasks in response thereto. For example, an IPA system may be configured to analyze the digital audio signal for recognizing user speech that can be indicative of a voice-based command uttered by the user.

Conventional IPA systems are mainly focused on extracting textual data (speech recognition) from the digital audio signal, processing it for understanding user's intent, and performing tasks in response thereto. For example, an IPA system may extract a textual representation of the user utterance from a digital audio signal, and may attempt to identify a user's intent based on that textual representation. When the user's intent is identified, the IPA system executes action(s) associated with that intent, such as providing the user with the current weather or the location of the nearest shopping mall, launching an application and the like.

However, identification of a user's intent based on text is not a trivial task for conventional IPA systems. This is in part due to the large variety of potential representations that an IPA system may need to deal with during run-time. For that reason, conventional IPA systems often fail to identify the user's intent and cannot perform a corresponding action.

United States Patent Publication No. 2019/0325864 entitled "AUTOMATED ASSISTANTS THAT ACCOMMODATE MULTIPLE AGE GROUPS AND/OR VOCABULARY LEVELS" and published on Oct. 24, 2019, discloses techniques for enabling an automated assistant to adjust its behavior depending on a detected age range and/or "vocabulary level" of a user who is engaging with the automated assistant. In various implementations, data indicative of a user's utterance may be used to estimate one or more of the user's age range and/or vocabulary level. The estimated age range/vocabulary level may be used to influence various aspects of a data processing pipeline employed by an automated assistant. In various implementations, aspects of the data processing pipeline that may be influenced by the user's age range/vocabulary level may include one or more of automated assistant invocation, speech-to-text ("STT") processing, intent matching, intent resolution (or fulfillment), natural language generation, and/or text-to-speech ("TTS") processing. In some implementations, one or more tolerance thresholds associated with one or more of these aspects, such as grammatical tolerances, vocabularic tolerances, etc., may be adjusted.

SUMMARY

Developers of the present technology have appreciated certain technical drawbacks associated with the existing IPA systems. Conventional IPA systems often fail to accurately identify a user's intent based on a textual representation of an utterance and therefore cannot execute a corresponding action for satisfying the user's intent.

Developers of the present technology have devised a system where the user's intent is to be identified via a matching process between textual data and a plurality of "grammars". Broadly speaking, a given grammar is associated with one or more actions to be executed by the system if the given grammar matches the textual data. In the context of the present technology, data indicative of a given grammar with corresponding one or more actions can be said to be, in a sense, a "skill" that the IPA system may make use of for satisfying the user's intent.

It should be noted that identifying the user's intent is not a trivial task because the system often may not find a match between the textual data and its grammars. This is due to a large variety of textual data that the system may encounter during in-use, and a large variety of skills that a conventional IPA system ought to possess for being competitive amongst others on the market.

In the context of the present technology, when the IPA system fails to match textual data with a grammar, even though it possess the corresponding skill for satisfying the user's intent, the IPA system can be said to have performed a "false negative" event because the IPA system has erroneously determined that it does not possess the corresponding skill for satisfying the user's intent.

Developers of the present technology have devised methods and systems that may allow reducing the number of false negative events that occur during run-time. In at least some embodiments of the present technology, the system is configured to generate a "graph structure" based on the textual representation extracted from the digital audio signal. The textual representation can be extracted via an Automatic Speech Recognition (ASR) engine.

Broadly speaking, the graph structure has nodes and edges and where different sequences of edges are representative of different candidate representations that are generated based on the extracted textual representation. Developers of the present technology have realized that testing a plurality of candidates against the grammars may reduce the number of false negative events.

Furthermore, conventional IPA system can require a considerable amount of computational resources for training an IPA system to make use of a newly added skill. Conventional IPA systems are implemented with Machine Learning Algorithms (MLAs) that are trained to understand the user's intent. These MLAs are typically first trained to classify examples of textual representations into a plurality of skill classes, and then are used during run-time to predict a skill based on an in-use textual representation and which the IPA system should use for satisfying the user's intent. However, addition of a new skill to the skillset of these IPA systems requires further training or re-training the classifying MLAs which is computationally expensive.

In at least some embodiments of the present technology, methods and systems are provided for reducing the amount of computational resources required for adding a new skill to the system. In at least some embodiments, developers of the present technology have devised methods and systems where the IPA system may not need to be re-trained for adding a new skill to the skillset.

In a first broad aspect of the present technology, there is provided a method of processing a spoken utterance associated with a user. The method is executable by an electronic device. The electronic device executes a Machine Learned Algorithm (MLA) for performing automatic speech recognition of the spoken utterance. The electronic device has access to a plurality of grammars. A given one of the plurality of grammars is representative of a respective user intent and associated with an action. The method comprises acquiring, by the electronic device, an indication of the spoken utterance, generating, by the electronic device using the MLA, a textual representation of the spoken utterance having words, identifying, by the electronic device, a nonce word and a non-normalized word amongst the words, and generating, by the electronic device, a plurality of candidate textual representations based on the textual representation. The plurality of candidate textual representations has at least one of a first set of candidate textual representations and a second set of candidate textual representations. Candidate textual representations from the first set are missing the nonce word from the words of the textual representation. Candidate textual representations from the second set have the non-normalized word from the words of the textual representation replaced by a normalized version thereof. The method comprises comparing, by the electronic device, the plurality of candidate textual representations against one of the plurality of grammars, and in response to a given candidate textual representation matching the one of the plurality of grammars, triggering, by the electronic device, an action associated with the one of the plurality of grammars.

In some embodiments of the method, the first set and the second set at least partially overlap.

In some embodiments of the method, both the first set and the second set include at least one common textual representation having the words from the textual representation (i) except for the nonce word and where (ii) the non-normalized word is replaced by the normalized version thereof.

In some embodiments of the method, the generating the plurality of candidate textual representations comprises generating, by the electronic device, a graph-structure having nodes connected by edges, a given sequence of edges being representative of a respective one from the plurality of candidate textual representations. The words from the textual representation are associated with respective edges from the graph-structure. The nonce word is associated with (i) a first edge indicative of a presence of the nonce word in a given candidate textual representation represented by a sequence of edges including the first edge, and (ii) a second edge indicative of an absence of the nonce word in a given candidate textual representation represented by a sequence of edges including the second edge. The non-normalized word is associated with (i) a third edge indicative of a presence of the non-normalized word in a given candidate textual representation represented by a sequence of edges including the third edge, and (ii) a fourth edge indicative of a presence of the normalized version thereof in a given candidate textual representation represented by a sequence of edges including the fourth edge.

In some embodiments of the method, the comparing the plurality of candidate textual representations comprises accessing, by the electronic device, the graph-structure for identifying a first candidate textual representation based on a first sequence of edges, and comparing, by the electronic device, the first candidate textual representation against at least one of the plurality of grammars.

In some embodiments of the method, the identifying the nonce word amongst the words comprises inputting, by the electronic device, the textual representation into a Neural Network (NN) configured to generate label data for the words from the textual representation, where the label data is indicative of which words amongst the words from the textual representation are nonce words.

In some embodiments of the method, the identifying the non-normalized word amongst the words comprises comparing, by the electronic device, the words from the textual representation against a list of pre-determined words, where a given pre-determined word in the list is a non-normalized word and associated with a normalized version thereof, and in response to a given word from the words of the textual representation matching a given pre-determined word from the list, generating, by the electronic device, label data for the given word, the label data being indicative of (i) the given word being the non-normalized word and (ii) the non-normalized version thereof.

In some embodiments of the method, the first set of candidate textual representations comprises a single member.

In some embodiments of the method, the second set of candidate textual representations comprises a single member.

In some embodiments of the method, the electronic device is a server communicatively coupled with a user device.

In some embodiments of the method, the electronic device is a user device of the user.

In a second broad aspect of the present technology, there is provided a method of processing a spoken utterance associated with a user. The method is executable by an electronic device. The electronic device executes a Machine Learned Algorithm (MLA) for performing automatic speech recognition of the spoken utterance. The electronic device has access to a plurality of grammars. A given one of the plurality of grammars is representative of a respective user intent and associated with an action. The method comprises acquiring, by the electronic device, an indication of the spoken utterance, generating, by the electronic device using the MLA, a textual representation of the spoken utterance having words, identifying, by the electronic device, a nonce word and a non-normalized word amongst the words, and generating, by the electronic device, a plurality of candidate textual representations based on the textual representation. The generating includes generating at least one candidate textual representation missing the nonce word from the words thereof, and at least one candidate textual representations having the non-normalized word from the words thereof replaced by a normalized version thereof. The method comprises comparing, by the electronic device, the plurality of candidate textual representations against one of the plurality of grammars, and in response to a given candidate textual representation matching the one of the plurality of grammars, triggering, by the electronic device, an action associated with the one of the plurality of grammars.

In some embodiments of the method, the plurality of candidate textual representations further comprises at least one candidate textual representation missing the nonce word from the words of the textual representation and the non-normalized word from the words of the textual representation replaced by a normalized version thereof.

In a third broad aspect of the present technology, there is provided an electronic device for processing a spoken utterance associated with a user. The electronic device executes a Machine Learned Algorithm (MLA) for performing automatic speech recognition of the spoken utterance. The electronic device has access to a plurality of grammars. A given one of the plurality of grammars is representative of a respective user intent and associated with an action. The electronic device is configured to acquire an indication of the spoken utterance, generate, using the MLA, a textual representation of the spoken utterance having words, identify a nonce word and a non-normalized word amongst the words, and generate a plurality of candidate textual representations based on the textual representation. The plurality of candidate textual representations having at least one of a first set of candidate textual representations and a second set of candidate textual representations. Candidate textual representations from the first set are missing the nonce word from the words of the textual representation. Candidate textual representations from the second set have the non-normalized word from the words of the textual representation replaced by a normalized version thereof. The electronic device is configured to compare the plurality of candidate textual representations against one of the plurality of grammars, and in response to a given candidate textual representation matching the one of the plurality of grammars, trigger an action associated with the one of the plurality of grammars.

In some embodiments of the electronic device, the first set and the second set at least partially overlap.

In some embodiments of the electronic device, both the first set and the second set include at least one common textual representation having the words from the textual representation (i) except for the nonce word and where (ii) the non-normalized word is replaced by the normalized version thereof.

In some embodiments of the electronic device, the electronic device configured to generate the plurality of candidate textual representations comprises the electronic device configured to generate a graph-structure having nodes connected by edges. A given sequence of edges is representative of a respective one from the plurality of candidate textual representations. The words from the textual representation are associated with respective edges from the graph-structure. The nonce word is associated with (i) a first edge indicative of a presence of the nonce word in a given candidate textual representation represented by a sequence of edges including the first edge, and (ii) a second edge indicative of an absence of the nonce word in a given candidate textual representation represented by a sequence of edges including the second edge. The non-normalized word is associated with (i) a third edge indicative of a presence of the non-normalized word in a given candidate textual representation represented by a sequence of edges including the third edge, and (ii) a fourth edge indicative of a presence of the normalized version thereof in a given candidate textual representation represented by a sequence of edges including the fourth edge.

In some embodiments of the electronic device, the electronic device configured to compare the plurality of candidate textual representations comprises the electronic device being configured to access the graph-structure for identifying a first candidate textual representation based on a first sequence of edges, and compare the first candidate textual representation against at least one of the plurality of grammars.

In some embodiments of the electronic device, the electronic device configured to identify the nonce word amongst the words comprises the electronic device configured to input the textual representation into a Neural Network (NN) configured to generate label data for the words from the textual representation, where the label data is indicative of which words amongst the words from the textual representation are nonce words.

In some embodiments of the electronic device, the electronic device configured to identify the non-normalized word amongst the words comprises the electronic device configured to compare the words from the textual representation against a list of pre-determined words, and a given pre-determined word in the list is a non-normalized word and associated with a normalized version thereof, and in response to a given word from the words of the textual representation matching a given pre-determined word from the list, generate label data for the given word, and where the label data is indicative of (i) the given word being the non-normalized word and (ii) the non-normalized version thereof.

In some embodiments of the electronic device, the first set of candidate textual representations comprises a single member.

In some embodiments of the electronic device, the second set of candidate textual representations comprises a single member.

In some embodiments of the electronic device, the electronic device is a server communicatively coupled to a user device.

In some embodiments of the electronic device, the electronic device is a user device of the user.

In the context of the present specification, a "server" is a computer program that is running on appropriate hardware and is capable of receiving requests (e.g., from devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "device" is any computer hardware that is capable of running software appropriate to the relevant task at hand. Thus, some (non-limiting) examples of devices include personal computers (desktops, laptops, netbooks, etc.), smartphones, and tablets, as well as network equipment such as routers, switches, and gateways. It should be noted that a device acting as a device in the present context is not precluded from acting as a server to other devices. The use of the expression "a device" does not preclude multiple devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
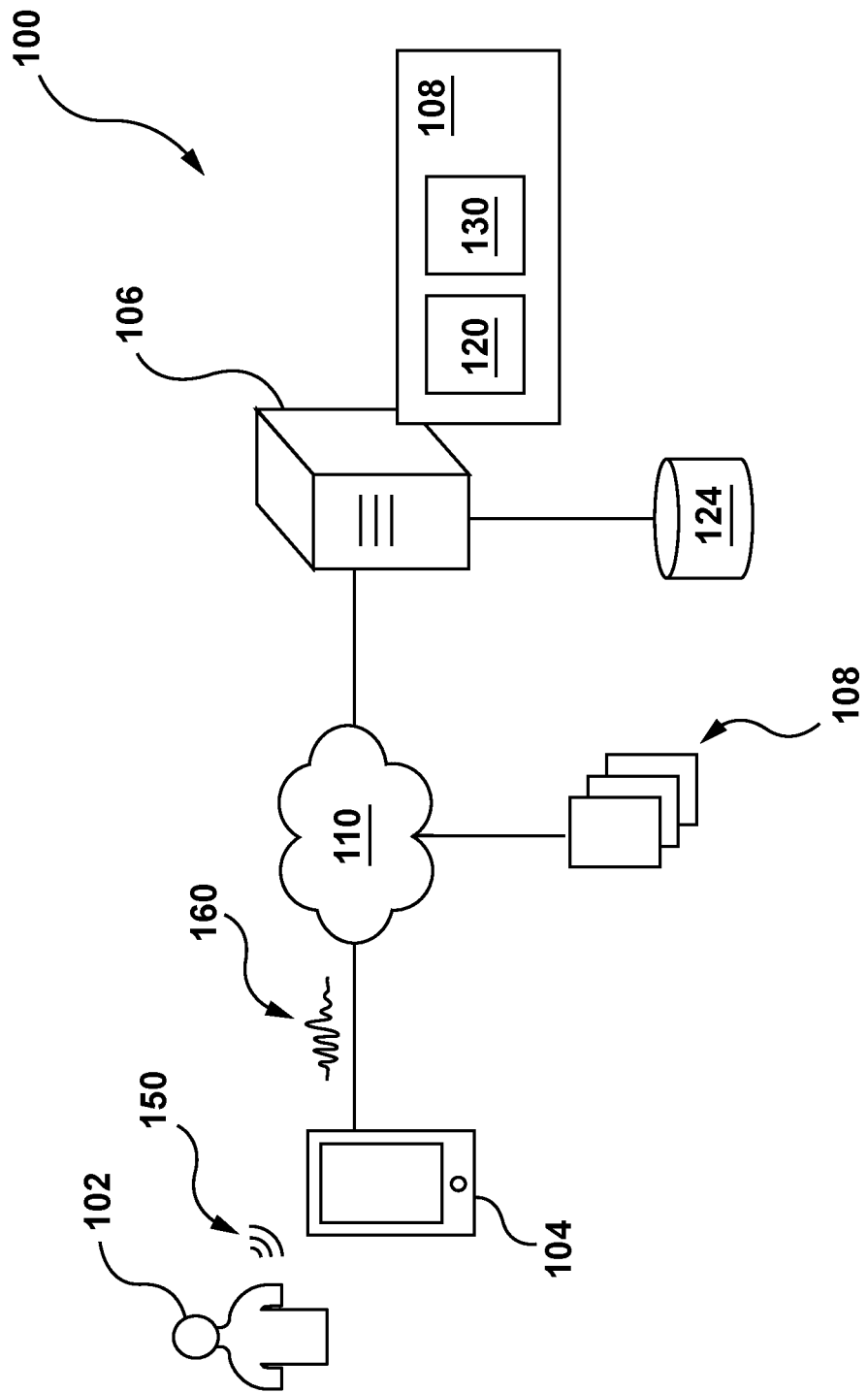
FIG. 1 depicts a system suitable for implementing non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology.

These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 may allow a user 102 to interact with an electronic device 104 via voice-based commands. To that end, the system 100 comprises the electronic device 104 (or simply a "device 104"), a communication network 110 and a server 106. In some embodiments, the electronic device 102 may be a smartphone. In other embodiments, the electronic device 102 may be a smart speaker.

As illustrated in FIG. 1, the user 102 may be uttering voice-based commands to the device 104. The device 104 is configured to record a digital audio signal 160 while the user 102 is uttering the voice-based command in a form of a user utterance 150. In other words, the device 104 is configured to record the digital audio signal 160 in real-time while the user 102 is uttering the user utterance 150 in proximity to the device 104.

The device 104 is configured to transmit data indicative of portions of the digital audio signal 160 to an IPA processing system 108 as the digital audio signal 160 is being recorded. In some embodiments of the present technology, the device 104 may be configured to transmit data indicative of the portions of the digital audio signal 160 to the IPA processing system 108 in real-time while the user 102 is uttering. In one example, the device 104 may be configured to transmit sequential portions of the digital audio signal 160 of a time length of 50 ms.

In some embodiments of the present technology, it is contemplated that processing of the digital audio signal 160 may be performed in a similar manner to what is described below locally on the electronic device 102, without departing from the scope of the present technology.

While receiving data indicative of sequential portions of the digital audio signal 160, broadly speaking, the IPA processing system 108 is configured to inter alia determine whether the user utterance 150 has ended during a most recently received portion of the digital audio signal 160.

Broadly speaking, the device 104 may be configured to transmit the digital audio signal 160 to the IPA processing system 108 for determining an intent associated with the user utterance 150 and for potentially executing one or more actions associated with that intent. For example, the IPA processing system 108 may determine that the user 104 intends to order food from a particular restaurant. In another example, the IPA processing system 108 may determine that the user intends to listen to a particular musician. As a result, the IPA processing system 108 may be configured to trigger one or more actions in response thereto, such as placing an order for food with the particular restaurant (if first intent) or play songs composed by the particular musician (if second intent).

It should be noted that, although the IPA processing system 108 is depicted in FIG. 1 as being implemented by the server 106, in other embodiments of the present technology, one or more (or all) components and/or functionalities of the IPA processing system 108 may be implemented by the device 104 (e.g., the IPA processing system 108 may be implemented locally on the device 104) without departing from the scope of the present technology. How various components of the system 100 can be implemented in some embodiments of the present technology will be discussed in greater details herein further below.

User Device

As previously mentioned, the system 100 comprises the device 104. The implementation of the device 104 is not particularly limited, but as an example, the device 104 may be implemented as a personal computer (desktops, laptops, netbooks, etc.), a wireless communication device (such as a smartphone, a cell phone, a tablet, a smart speaker and the like). As such, the device 104 can sometimes be referred to as an "electronic device", "end user device", "client electronic device", "user electronic device" or simply "device". It should be noted that the fact that the device 104 is associated with the user 102 does not need to suggest or imply any mode of operation—such as a need to log in, a need to be registered, or the like.

It is contemplated that the device 104 comprises hardware and/or software and/or firmware (or a combination thereof) in order detect the user utterance 150 and/or to record the digital audio signal 160. Generally speaking, the digital audio signal 160 is an output of an audio recording performed by the device 104 while the user 102 is uttering the user utterance 150. As such, the digital audio signal 160 is representative of soundwaves which are detected, recorded, and converted into a digital form in real-time while the user 102 is uttering.

In some embodiments, the device 104 may also comprise hardware and/or software and/or firmware (or a combination thereof) in order to execute an IPA application. Generally speaking, the purpose of the IPA application, also known as a "chatbot", is to enable the user 102 to interact with the device 104 by means of speech. The IPA application may enable speech-based interaction between the user 102 and the device 104 by employing the IPA processing system 108. Thus, it can be said that the IPA application is associated with the IPA processing system 108.

It should be noted that, in some embodiments of the present technology, the device 104 may also implement components and/or functionalities of the server 106. For example, the device 104 may comprise hardware and/or software and/or firmware (or a combination thereof), as is known in the art, in order to locally implement the IPA processing system 108. In such a case, both the IPA application and the IPA processing system 108 can be implemented locally on the device 104 without departing from the scope of the present technology.

In some embodiments of the present technology, where the IPA processing system 108 is implemented by the server 106, the device 104 may be configured to transmit data indicative of the portions of the digital audio signal 160, as mentioned above, to the server 106.

Therefore, it can be said that, in some embodiments of the present technology, where the IPA processing system 108 is implemented by the server 106, the device 104 may be configured to transmit a plurality of data packets to the server 106 and where the data packets comprise data indicative of sequential portions of the digital audio signal 160.

In other embodiments of the present technology, where the IPA processing system 108 is implemented by the device 104, the device 104 may be configured to locally transmit a given stream of data packets to the IPA processing system 108 and where the data packets comprise data indicative of sequential portions of the digital audio signal 160.

Communication Network

In the illustrative example of the system 100, the device 104 is communicatively coupled to the communication network 110 for accessing and transmitting data packets to/from the server 106. In some non-limiting embodiments of the present technology, the communication network 110 can be implemented as the Internet. In other non-limiting embodiments of the present technology, the communication network 110 can be implemented differently, such as any wide-area communication network, local-area communication network, a private communication network and the like. How a communication link (not separately numbered) between the device 104 and the communication network 110 is implemented will depend inter alia on how the device 104 is implemented.

Merely as an example and not as a limitation, in those embodiments of the present technology where the device 104 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the device 104 is implemented as a notebook computer, the communication link can be either wireless (such as Wireless Fidelity, or WiFi® for short, Bluetooth® or the like) or wired (such as an Ethernet based connection).

In some embodiments of the present technology, where the IPA processing system 108 is implemented by the device 104, the communication network 110 may be omitted without departing from the scope of the present technology.

Database

The server 106 is also communicatively coupled to a database 124. In the depicted illustration, the database 124 is depicted as single physical entity. This does not need to be so in each and every embodiment of the present technology. As such, the database 124 may be implemented as a plurality of separate databases. Optionally, the database 124 may be split into several distributed storages.

The database 124 is configured to store information processed or used by the server 106. Generally speaking, the database 124 may receive data from the server 106 for temporary and/or permanent storage thereof and may provide stored data to the server 106 for processing thereof.

In some embodiments, the database 124 may store data that can be used by the server 106 in order to generate at least some training data for training at least some components of the IPA processing system 108. In other embodiments, the database 124 may store the training data itself that the server 106 may use for training the at least some components of the IPA processing system 108.

In one embodiment, the database 124 may store a plurality of digital audio signals. For example, the database 124 may store a large number of digital audio signals such as 10000, 100000, 1000000 and the like. The plurality of digital audio signals may be collected and stored in the database 124 in many different ways. However, just as examples, the plurality of digital audio signals can be recorded by human-assessors and/or crowed-sourced. In one example, the plurality of digital audio signals may be audio recordings of utterances that are indicative of typical user utterances performed by users while interacting with devices similar to the device 104. In a case where the device 104 is "a smart-speaker-type" of device, typical user utterances may be, but are not limited to: "Turn off", "Play music", "Lower the volume", "What is the current whether", "Where is the nearest gas station", "Sleep mode", "Call Roman", "Set a reminder for seven am", and so on.

In some embodiments, the database 124 may store textual representations of user utterances associated with the respective ones of the plurality of digital audio signals. For example, the database 124 may store a plurality of textual representations and which are respectively associated with the plurality of digital audio signals. The plurality of textual representations may be collected and stored in the database 124 in many different ways. However, just as examples, the plurality of textual representations can be generated by the human-assessors and/or crowed-sourced who recorded the digital audio signals and/or generated by speech to text processing of the digital audio signals by a computer-based system.

In some embodiments of the present technology, the database 124 may store data representative of a plurality of "skills", or "skillset", associated with the IPA processing system 108. Broadly speaking, a given skill comprises data is associated with a given "grammar" and one or more corresponding actions. It should be noted that grammars may be selected by the operator of the IPA processing system 108 and/or added over time (e.g., newly added skills), and may represent intents of users.

For example, one grammar, "play <artist>", may be associated with an action that causes the IPA processing system 108 to play music by the <artist> on the device 104 operated by the user 102. In this example, the data indicative of the grammar and the corresponding action to be taken (a given skill) can be stored in the database 124.

In further embodiments, the database 124 may store a list of normalized words associated with respective non-normalized versions thereof. Broadly speaking, the database 124 can store a list of words in their canonical forms, and where those words are respective associated with non-normalized versions or non-canonical forms thereof. For example, the word "play" is a normalized version or canonical form of the words "played" "playing" "playable".

Server

As previously mentioned, the system 100 also comprises the server 106 that can be implemented as a conventional computer server. In an example of an embodiment of the present technology, the server 106 can be implemented as a Dell™ PowerEdge™ Server running the Microsoft™ Windows Server™ operating system. Needless to say, the server 106 can be implemented in any other suitable hardware, software, and/or firmware, or a combination thereof. In the depicted non-limiting embodiments of the present technology, the server 106 is a single server. In alternative non-limiting embodiments of the present technology, the functionality of the server 106 may be distributed and may be implemented via multiple servers.

Generally speaking, the server 106 is configured to acquire data indicative of the digital audio signal 160, and use the IPA processing system 108 for determining an intent associated with the digital audio signal 160 and for performing various actions in response thereto. The IPA processing system 108 comprises an Automatic Speech Recognition (ASR) engine 120 and an intent matching engine 130.

Broadly speaking, the ASR engine 120, sometimes referred to as "Speech To Text" (STT) engine, is embodied as a plurality of computer-implemented algorithms that enable computer-based systems to recognize and translate spoken language into a text-based form.

Figure 2:
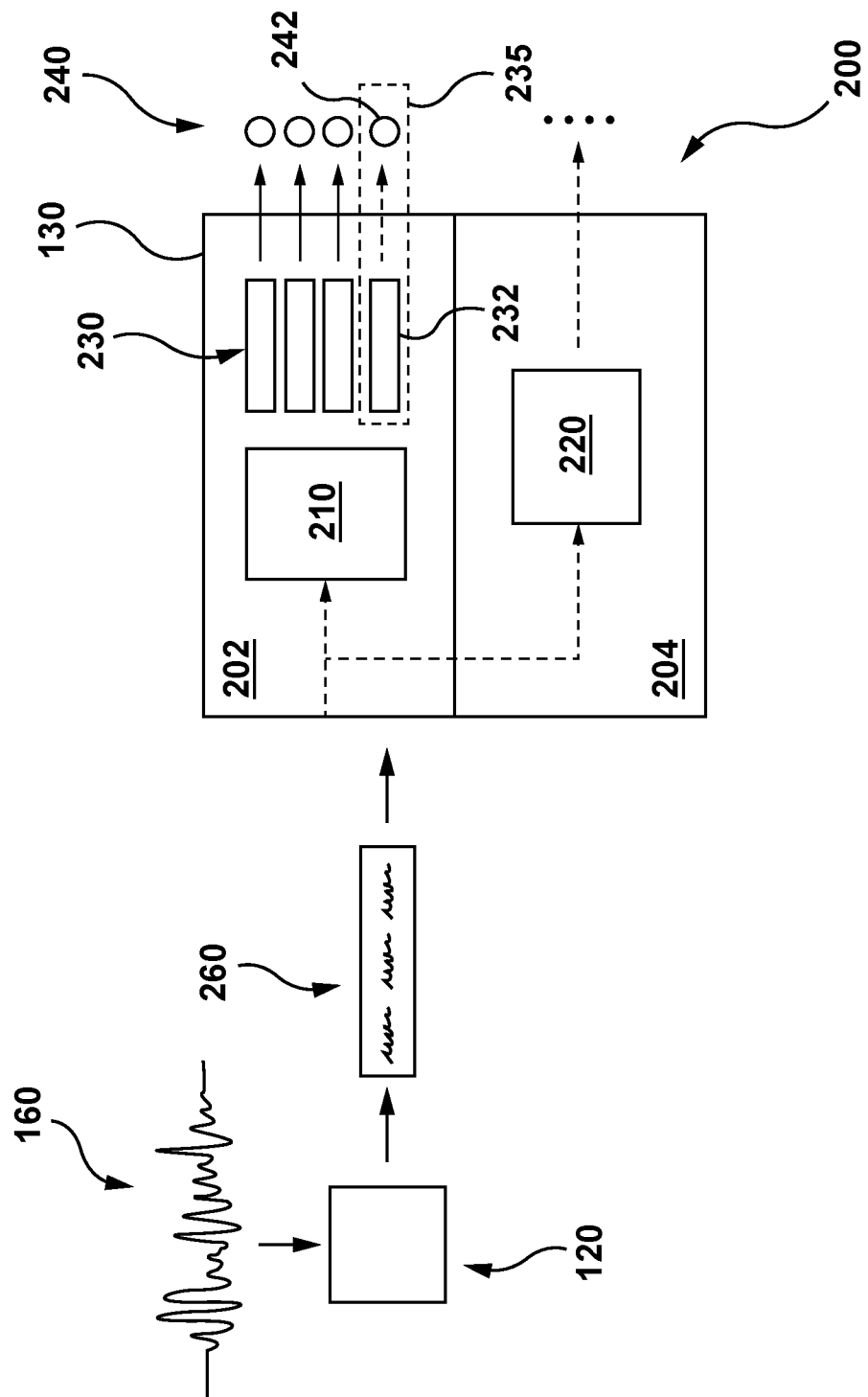
FIG. 2 depicts a representation of an intent matching engine implemented by a server of the system of FIG. 1, in accordance with at least some embodiments of the present technology.

For example, as it will be discussed in greater details with reference to FIG. 2, the server 106 may input the digital audio signal 160 into the ASR engine 120. The ASR engine 120 is configured to process the digital audio signal 160 and output, in response, a textual representation 260. It is contemplated that the server 106 may iteratively input digital audio signals into the ASR engine 120 that, in response, may generate the respective textual representations. In at least one embodiment, the plurality of digital audio signals and the corresponding textual representations stored in the database 124 may be generated by the server 106 employing the ASR engine 120.

As mentioned above, the IPA processing system 108 also comprises an intent matching engine 130. Broadly speaking, the intent matching engine 130 is embodied as a plurality of computer-implemented algorithms that enable the server 106 to process the textual representation 260 in order to determine an intent of the user 102 by matching it against a grammar and, in response, trigger one or more actions associated with that grammar. As seen on FIG. 2, the textual representation 260 is fed into the intent matching engine 130 that has a "light" intent matching sub-engine 202 and a "heavy" intent matching sub-engine 204.

Broadly speaking, the light intent matching sub-engine 202 is configured to process the textual representation 260 and attempt to determine the intent of the user 102 and trigger one or more actions associated therewith. The light intent matching sub-engine 202 comprises a graph generator 210 that is broadly configured to generate a plurality of candidate textual representations based on the textual representation 260. The light intent matching sub-engine 202 is then configured to attempt to match the so-generated candidates against one or more of a plurality of grammars 230. If a match occurs, the server 106 may trigger one or more corresponding actions from a plurality of actions 240 and which is associated with the matched grammar.

If the light intent matching sub-engine 202 is not able to identify the intent of the user 102—that is, the light intent matching sub-engine 202 is unable to match so-generated candidates against one of a plurality of grammars 230, the textual representation 260 is transmitted to the heavy intent matching sub-engine 204 for more resource-intensive processing.

Broadly speaking, the heavy intent matching sub-engine 204 comprises a Machine Learning Algorithm (MLA) 220 configured to process the textual representation 260 in order to determine the intent associated therewith and trigger one or more actions associated therewith.

Broadly speaking, a given MLA is first "built" (or trained) using training data and training targets. During a given training iteration, the MLA is inputted with a training input, and generates a respective prediction. The server 106 is then configured to, in a sense, "adjust" the MLA based on a comparison of the prediction against a respective training target for the training input. For example, the adjustment may be performed by the server 106 employing one or more machine learning techniques such as, but not limited to, a back-propagation technique. After a large number of training iterations, the MLA is thus "adjusted" in a manner that allows making predictions based on inputted data such that those predictions are close to the respective training targets.

It should be noted that executing the MLA 220 of the heavy intent matching sub-engine 204 requires using a comparatively larger amount of computational resources for the purpose of matching the textual representation 260 with one of the plurality of grammars 230 than using the light intent matching sub-engine 202. It can be said that when the light intent matching sub-engine 202 fails to identify the intent of the textual representation 260, the server 106 may use the heavy intent matching sub-engine 204 as a secondary option for identifying the intent of the textual representation 260.

Developers of the present technology have realized that, when a given new skill is to be added to the intent matching engine 130, in order to configure the heavy intent matching sub-engine 204 to be able to match the textual representation 260 with a new grammar from the given new skill, the MLA 220 has to be further trained based on training examples associated with the new skill. Further training of the MLA 220 requires a considerable amount of time and/or computational resources from the server 106.

The developers of the present technology have realized that, instead of further training the MLA 220 based on training examples associated with a new skill 235, the new skill 235 may be added to the intent matching engine 130 by configuring the light intent matching sub-engine 202 to be able to match a new grammar 232 from the new skill 235 (the new grammar 232 and a corresponding action 242) to the textual representation 260. For example, as illustrated in FIG. 2, the new grammar 232 may be added to the plurality of grammars 230 that are potentially matchable by the light intent matching sub-engine 202. Furthermore, as it will be described in greater details herein further below, developers of the present technology have devised methods and systems that allow processing the textual representation 260 prior to matching against the plurality of grammars 230 so as to reduce the number of "false negative" events—that is, instances when the textual representation 260 is not matched with any grammar from the plurality of grammars 230, although it should be.

This processing of the textual representation 260 prior to matching against the plurality of grammars 230 for reducing the number of false positive events is executed via the graph generator 210. How the graph generator 210 is implemented and how the server 106 may be configured to use graph generator 210 as part of the intent matching engine 130 will now be discussed in greater detail.

Figure 3:
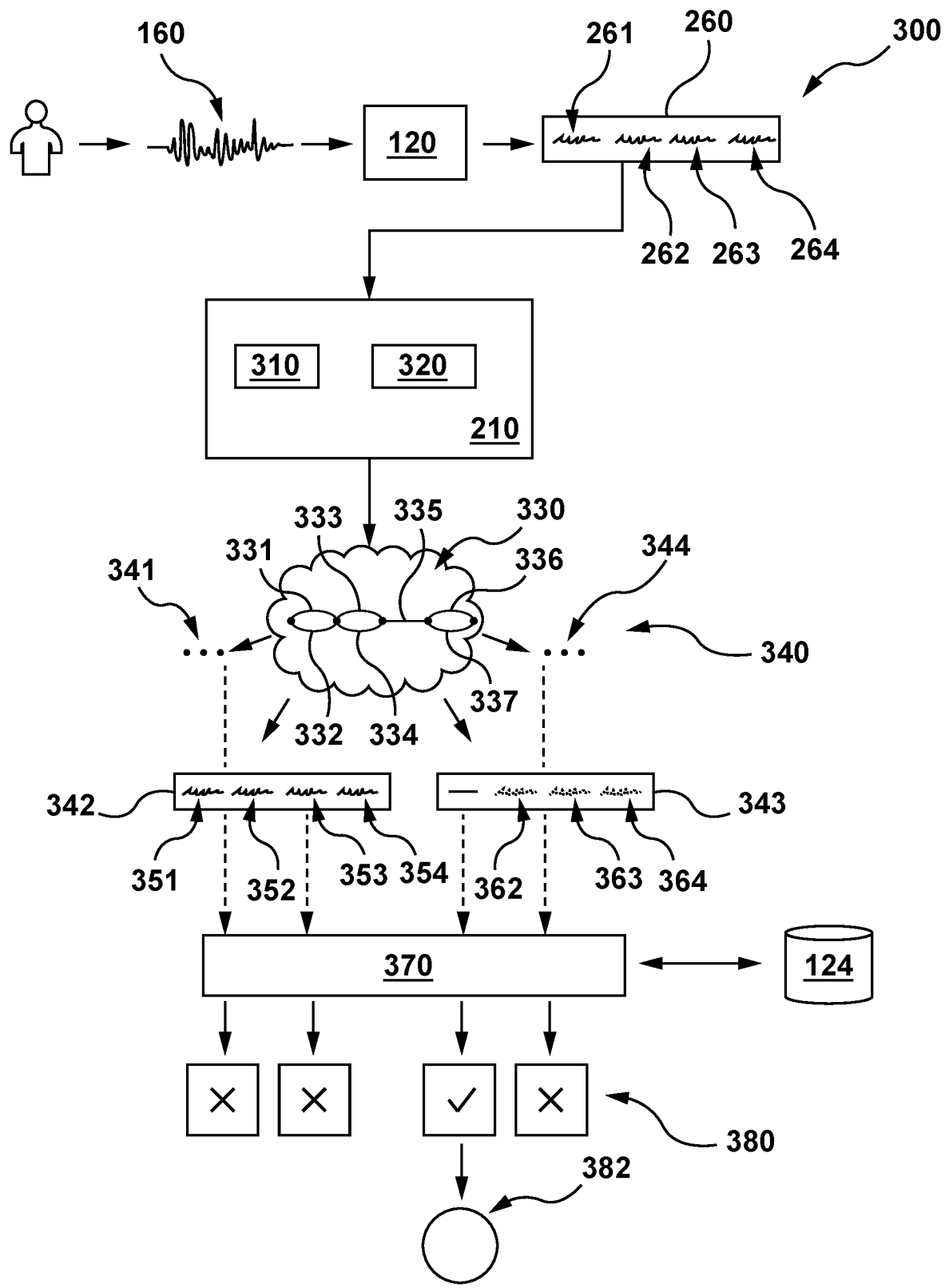
FIG. 3 depicts a representation of how the intent matching engine of FIG. 2 is configured to trigger a given action, in accordance with at least some embodiments of the present technology.

With reference to FIG. 3, there is depicted a representation 300 of how the light intent matching engine 202 may be configured to trigger a given action for satisfying the intent of the user 102. Let it be assumed that the ASR engine 120 generates the textual representation 260 comprising a first word 261, a second word 262, a third word 263, and a fourth word 264. As mentioned above, the server 106 may be configured to transmit the textual representation 260 to the graph generator 210 for generating data representative of a graph-structure 330. To that end, the graph generator 210 may comprise a "nonce tagger" 310 and a "text normalizer" 320 for processing the textual representation 260.

Broadly speaking, the nonce tagger 310 is configured to process the textual representation 260 for identifying which word(s) amongst the first word 261, the second word 262, the third word 263, and the fourth word 264 is/are nonce word(s). A nonce word (also called an occasionalism) is a lexeme created for a single occasion to solve an immediate problem of communication. The term is used because such a word is created "for the nonce" (i.e. for the time being, or this once). All nonce words can also include neologisms that is, recent or relatively new words that have not been fully accepted into mainstream or common use. It can be said that the nonce word can be said to be a word that is potentially unnecessary for identifying the intent of the user.

It is contemplated that the server 106 may be configured to implement the nonce tagger 310 as a Neural Network (NN) configured to acquire the textual representation 260 as input, and provide as an output label data for respective words from the textual representation 260 which is indicative of whether respective words are and/or are not nonce words Generally speaking, a given NN consists of an interconnected group of artificial "neurons", which process information using a connectionist approach to computation. NNs are used to model complex relationships between inputs and outputs (without actually knowing the relationships) or to find patterns in data. NNs are first conditioned in a training phase in which they are provided with a known set of "inputs" and information for adapting the NN to generate appropriate outputs (for a given situation that is being attempted to be modelled). During this training phase, the given NN adapts to the situation being learned and changes its structure such that the given NN will be able to provide reasonable predicted outputs for given inputs in a new situation (based on what was learned). Thus rather than try to determine a complex statistical arrangements or mathematical algorithms for a given situation; the given NN tries to provide an "intuitive" answer based on a "feeling" for a situation. The given NN is thus a kind of a trained "black box", which can be used in a situation when what is in the "box" is unimportant; it is only important that the "box" provide reasonable answers to given inputs.

NNs are commonly used in many such situations where it is only important to know an output based on a given input, but exactly how that output is derived is of lesser importance or is unimportant. For example, NNs are commonly used to optimize the distribution of web-traffic between servers and in data processing, including filtering, clustering, signal separation, compression, vector generation, speech recognition, and the like.

It should be understood that NNs can be classified into various classes of NNs. One of these classes comprises recurrent neural networks (RNNs). These particular NNs are adapted to use their "internal states" (stored memory) to process sequences of inputs. This makes RNNs well-suited for tasks such as unsegmented handwriting recognition and speech recognition, for example. These internal states of the RNNs can be controlled and are referred to as "gated" states or "gated" memories.

It should also be noted that RNNs themselves can also be classified into various sub-classes of RNNs. For example, RNNs can be implemented as Long Short-Term Memory (LSM) networks, Gated Recurrent Units (GRUs), Bidirectional RNNs (BRNNs) and the like.

LSTM networks are deep learning systems that can learn tasks that require, in a sense, "memories" of events that happened during very short and discrete time steps earlier. Topologies of LSTM networks can vary based on specific tasks that they "learn" to perform. For example, LSTM networks may learn to perform tasks where relatively long delays occur between events or where events occur together at low and at high frequencies. In some embodiments of the present technology, it is contemplated that the nonce tagger 310 may be implemented as a given LSTM network. It is also contemplated that the nonce tagger 310 may be implemented as a given bi-LSTM network.

Broadly speaking, the server 106 is configured to implement the normalizer 320 as one or more computer-implemented algorithms that are configured to identify one or more non-normalized words amongst the words of the textual representation 260. For example, recalling that the database 124 stores a list of normalized words associated with respective non-normalized versions thereof, the server 106 may be configured to compare the first word 261, the second word 262, the third word 263, and the forth word 264 against non-normalized words in the database 124. If a match occurs, the server 106 may be configured to identify (via a label for example) the respective word from the textual representation 260 as a given non-normalized word and may retrieve a given normalized version thereof from the database 124.

Therefore it can be said that the server 106 employing the nonce tagger 310 may be configured to identify a given nonce word amongst the words of the textual representation 260 and a given non-normalized word amongst the words of the textual representation 260. Let it be assumed that the server 106 identifies the first word 261 as being a given nonce word, and the second word 262 and the fourth word 264 as respective non-normalized words. The server 106 may employ this information for generating the graph structure 330 that is indicative of a plurality of candidate textual representations 340.

Broadly speaking, the graph-structure 330 has nodes connected by edges and where a given sequence of edges is representative of a respective candidate textual representation. It should be noted that each word from the textual representation 260 is associated with at least one edge from the graph-structure 330. In the illustrated example, edges 331 and 332 are associated with the first word 261, edges 333 and 334 are associated with the second word 262, edge 335 is associated with the third word 263, and edges 336 and 337 are associated with the fourth word 264.

It should be noted that for the first word 261, the server 106 may be configured to generate two edges in the graph structure 330 because the first word 261 is identified as a given nonce word. As it will become apparent from the present description, the first word 261 is thus associated with (i) the edge 331 indicative of a presence of the first word 261 in a given candidate textual representation represented by a sequence of edges including the edge 331, and (ii) the edge 332 indicative of an absence of the first word 261 in a given candidate textual representation represented by an other sequence of edges including the edge 332.

It should be noted that for the second word 262, the server 106 may be configured to generate two edges in the graph structure 330 because the second word 262 is identified as a given non-normalized word. As it will become apparent from the present description, the second word 262 is thus associated with (i) the edge 333 indicative of a presence of the second word 262 (the non-normalized word) in a given candidate textual representation represented by a sequence of edges including the edge 333, and (ii) the edge 334 indicative of a presence of the normalized version of the second word 262 (retrieved from the database 124) in a given candidate textual representation represented by an other sequence of edges including the edge 334.

It should be noted that for the third word 263, the server 106 may be configured to generate only one edge in the graph structure 330 because the third word 263 is not identified as a given nonce word or a given non-normalized word. Thus, the third word 263 is associated with the edge 335 indicative of a presence of the third word in a given candidate textual representation represented by a sequence of edges including the edge 335. However, it should be noted that the server 106 is configured to generate the graph structure 330 such that all sequences of edges include the edge 335, which means that each one of the plurality of candidate textual representations 340 will include the third word 263.

Similarly to the second word 262, for the fourth word 264, the server 106 may be configured to generate two edges in the graph structure 330 because the fourth word 264 is identified as a given non-normalized word. As it will become apparent from the present description, the fourth word 264 is thus associated with (i) the edge 336 indicative of a presence of the fourth word 264 (the non-normalized word) in a given candidate textual representation represented by a sequence of edges including the edge 336, and (ii) the edge 337 indicative of a presence of the normalized version of the fourth word 264 (retrieved from the database 124) in a given candidate textual representation represented by an other sequence of edges including the edge 337.

It is contemplated that in at least some embodiments of the present technology, the server 106 may be configured to employ both the nonce tagger 310 and the normalizer 320 together when generating the graph structure 330.

The server 106 may be configured to access the graph structure 330 to retrieve candidate textual representations associated with respective sequences of edges in the graph structure 330. As such, the server 106 may be configured to retrieve the plurality of candidate textual representations 340 comprising a first candidate 341, a second candidate 342, a third candidate 343, and a fourth candidate 344. It should be noted that in the illustrated example, the plurality of candidate textual representations 340 comprises eight different candidates. However, the number of candidates in the plurality of candidate textual representations 340 depends on inter alia a specific implementation of the present technology as a person skilled in the art will understand.

Let it be assumed that the server 106 retrieves the second candidate 342 based on the sequence of the edges 331, 333, 335, and 336. This means that words 351, 352, 353, and 354 in the second candidate 342 are the first word 361, the second word 362, the third word 363, and the fourth word 364, respectively. In other words, the second candidate 342 may be identical to the textual representation 260.

Let it be assumed that the server 106 retrieves the third candidate 343 based on the sequence of the edges 332, 334, 335, and 337. This means that the third candidate 342 has the first word 361 missing therefrom and comprises the normalized version of the second word 362, the third word 363, and the normalized version of the fourth word 364.

The server 106 may be configured to provide a respective candidate from the plurality of candidate representations 340 to a matching algorithm 370. Broadly speaking, the matching algorithm 270 has access to the plurality of grammars 230 stored in the database 124 and is configured to determine whether the words from a given candidate match a given one from the plurality of grammars. For example, the server 106 may be configured to employ the matching algorithm 270 for generated matching data 380 indicative which candidate matched which grammar.

Let it be assumed that the server 106 determines that the first candidate 341, the second candidate 342, and the third candidate 343 did not match any of the plurality of grammars 230. However, let it also be assumed that the third candidate 343 did match a given grammar from the plurality of grammars 230. As a result, the server 106 may be configured to execute an action 382 associated with the given grammar from the plurality of grammars 230 which has been matched against the third candidate 343 in order to satisfy the intent of the user 102.

In some embodiments of the present technology, upon more than one candidate from the plurality of candidates matching with grammars from the plurality of grammars 230, the server 106 may be configured to select which action amongst the corresponding so-matched grammars is to be executed in order to satisfy the intent of the user 102. To that end, in some embodiments, the database 124 may be configured to store a skill prioritization list that lists various skills of the IPA processing system 108 in a pre-determined prioritization order. Thus, the server 106 may access the database 124 and determine that an action associated with a mot prioritized grammar amongst the so-matched grammars is to be executed for satisfying the intent of the user 102.

Figure 4:
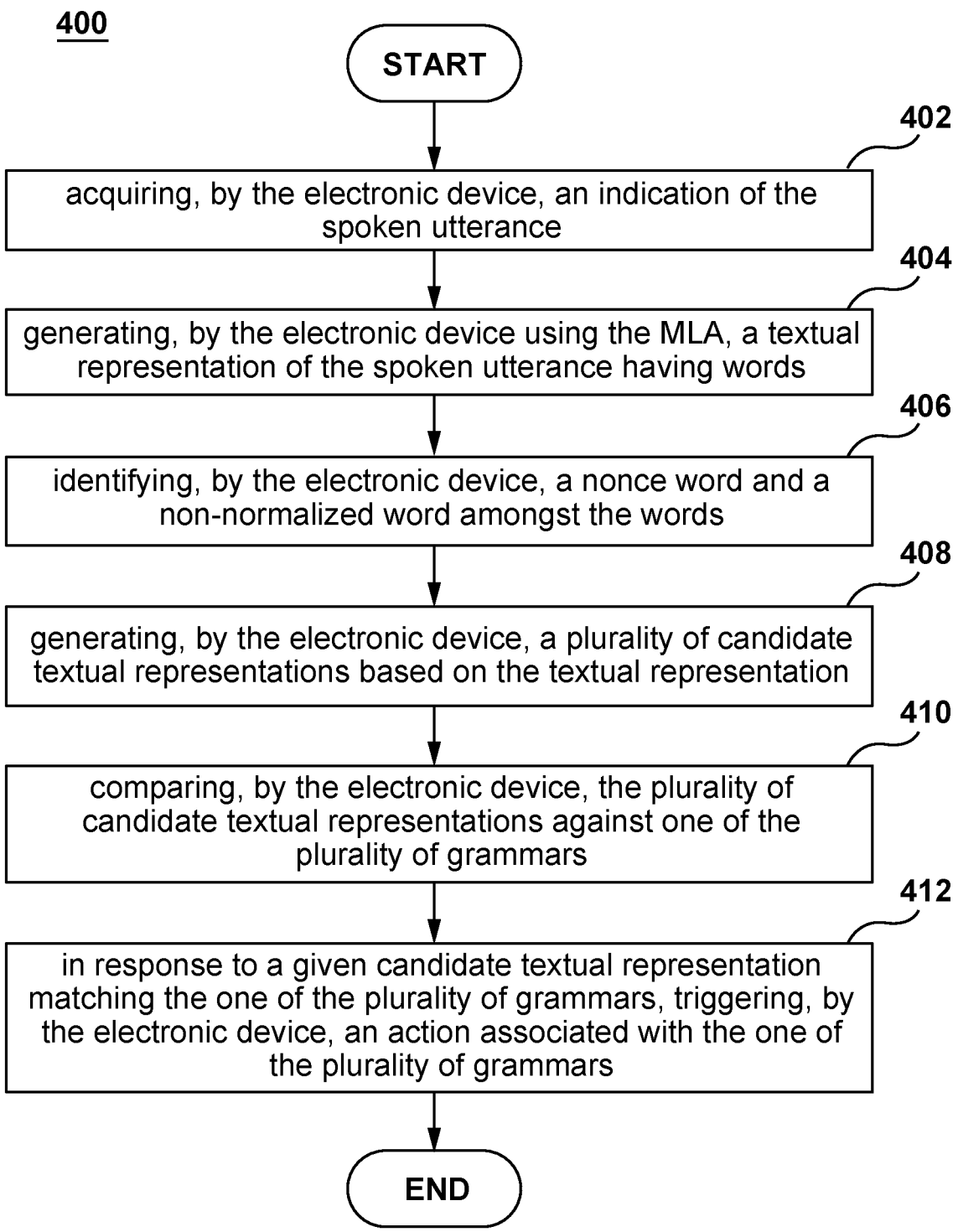
FIG. 4 is a schematic block diagram illustrating a flow chart of a method executed by an electronic device in accordance with non-limiting embodiments of the present technology.

With reference to FIG. 4, there is depicted a scheme-block representation of a computer-implemented method 400 executable by a given electronic device. For example, in some embodiments of the present technology, the method 400 may be executed by the server 106. However, it should be noted that the method 400 may be executed locally on the electronic device 104 of the user 102. Various steps of the method 400 will now be described in greater detail.

Step 402: Acquiring, by the Electronic Device, an Indication of the Spoken Utterance The method 400 begins at step 402 with the server 106 configured to acquire an indication of the spoken utterance 150 of the user 102. For example, the server 106 may be configured to acquire the digital audio signal 160 from the electronic device 104. In at least some embodiments, it is contemplated that the digital audio signal 160 may be received via a plurality of data packets transmitted by the communication network 110.

In some embodiments, the electronic device 104 may also be configured to acquire the indication of the spoken utterance. For example, the electronic device 104, such as a smartphone or a smart speaker, for example, may be configured to capture the user utterance 150 of the user 102 and use the digital audio signal 160 as the indication of the spoken utterance 150.

Step 404: Generating, by the Electronic Device Using the MLA, a Textual Representation of the Spoken Utterance Having Words The method 400 continues to step 404 with the server 106 configured to generate the textual representation 260 of the spoken utterance 150. It should be noted that the textual representation 260 has words 261, 262, 263, and 264. In at least some embodiments, the server 106 may be configured use the ASR engine 120 for recognizing and translating spoken language into a text-based form.

Step 406: Identifying, by the Electronic Device, a Nonce Word and a Non-Normalized Word Amongst the Words The method 400 continues to step 406 with the server 106 configured to identify a given nonce word and a given non-normalized word amongst the words in the textual representation 260. As mentioned above, the server 106 may make use of the nonce tagger 310 and the normalizer 320 for identifying amongst the words of the textual representation 260 at least one nonce word and at least one non-normalized word.

It should be noted that the nonce word can be a lexeme created for a single occasion to solve an immediate problem of communication. Such terms are used because they are created "for the nonce" (i.e. for the time being, or this once). Nonce words can also include neologisms that is, recent or relatively new words that have not been fully accepted into mainstream or common use. It can be said that the nonce word can be said to be a word that is potentially unnecessary for identifying the intent of the user.

It is contemplated that the server 106 may be configured to implement the nonce tagger 310 as an NN configured to acquire the textual representation 260 as input, and provide as an output label data for respective words from the textual representation 260 which is indicative of whether respective words are and/or are not nonce words. In at least some embodiments of the present technology, the server 106 configured to identify the nonce word amongst the words comprises the server 106 configured to inputting, by the server, the textual representation 260 into the NN configured to generate label data for the words from the textual representation, and where the label data is indicative of which words amongst the words from the textual representation 260 are nonce words. In at least some embodiments, the NN may be trained based on training data including examples of textual representations and human-assessed labels for respective words from these examples and where those labels may be indicative of ground-truth classes such as "nonce class" and "non-nonce class", for example.

In at least some embodiments of the present technology, the server 106 configured to identify the non-normalized word amongst the words comprises the server 106 configured to compare the words from the textual representation 260 against a list of pre-determined words. For example, the list of pre-determined words may be stored in the storage 124. It should be noted that a given pre-determined word in the list is a non-normalized word and associated with a normalized version thereof. In response to a given word from the words of the textual representation 260 matching a given pre-determined word from the list, the server 106 may be configured to generate label data for the given word. This label data is indicative of (i) the given word being the non-normalized word and (ii) the non-normalized version thereof.

Step 408: Generating, by the Electronic Device, a Plurality of Candidate Textual Representations Based on the Textual Representation The method 400 continues to step 408 with the server 106 configured to generate the plurality of candidate textual representations 340 based on the textual representation 260. It should be noted that the plurality of candidate textual representation 340 has at least one of a first set of candidate textual representations and at least one of a second set of candidate textual representations. It should be noted that candidate textual representations from the first set are missing the nonce word from the words of the textual representation 260. It should also be noted that candidate textual representations from the second set have the non-normalized word from the words of the textual representation replaced by a normalized version thereof.

It is contemplated that the first set and the second set at least partially overlap. For example, the plurality of candidate textual representations 340 may comprise at least one candidate representation that is missing the nonce word and where the non-normalized word is replaced by a normalized version thereof. For example, both the first set and the second set may include at least one common textual representation having the words from the textual representation (i) except for the nonce word and where (ii) the non-normalized word is replaced by the normalized version thereof.

In some embodiments, the first set of candidate textual representations amongst the plurality of candidate textual representations 260 may comprise a single member. In other embodiments, the second set of candidate textual representations amongst the plurality of candidate textual representations 260 may comprise a single member.

In some embodiments of the present technology, the server generating the plurality of candidate textual representations 340 may comprise the server 106 configured to generate graph structure 330 (see FIG. 3). As explained above, the graph structure 330 has nodes connected by edges, and a given sequence of edges is representative of a respective one from the plurality of candidate textual representations 340.

It should be noted that words from the textual representation 260 may be associated with respective edges from the graph structure 330. A given nonce word may be associated with (i) a first edge indicative of a presence of the nonce word in a given candidate textual representation represented by a sequence of edges including the first edge, and (ii) a second edge indicative of an absence of the nonce word in a given candidate textual representation represented by a sequence of edges including the second edge. Also, the non-normalized word may be associated with (i) a third edge indicative of a presence of the non-normalized word in a given candidate textual representation represented by a sequence of edges including the third edge, and (ii) a fourth edge indicative of a presence of the normalized version thereof in a given candidate textual representation represented by a sequence of edges including the fourth edge.

In at least some embodiments of the present technology, it can be said that the graph structure 330 is a directed graph structure where sequences of edges are oriented in one direction. For example, as illustrated in FIG. 3, sequences of edges are oriented from left to right. It is contemplated that a given sequence of edges may be a given path in the directed graph structure. Furthermore, in other embodiments, the nodes in the graph structure 330 may correspond to "gaps" between the words of the textual representation and/or candidate textual representation.

Step 410: Comparing, by the Electronic Device, the Plurality of Candidate Textual Representations Against One of the Plurality of Grammars The method 400 continues to step 410 with the server 106 configured to compare the plurality of candidate textual representations against one of the plurality of grammars 230. In some embodiments, the server 106 may be configured to provide a respective candidate from the plurality of candidate representations 340 to the matching algorithm. For example, the server 106 may be configured to employ the matching algorithm 270 for generated matching data 380 indicative which candidate matched which grammar.

It is contemplated that the server 106 configured to compare the plurality of candidate textual representations 340 may comprise the server 06 configured to access the graph structure 330 for identifying a first candidate textual representation based on a first sequence of edges and compare the first candidate textual representation against at least one of the plurality of grammars 230.

Step 412: In Response to a Given Candidate Textual Representation Matching the One of the Plurality of Grammars, Triggering, by the Electronic Device, an Action Associated with the One of the Plurality of Grammars The method 400 continues to step 412 with the server 106, in response to a given candidate textual representation matching the one of the plurality of grammars 230, configured to trigger an action associated with the one of the plurality of grammars 230.

Let it be assumed that the server 106 determines that the first candidate 341, the second candidate 342, and the third candidate 343 did not match any of the plurality of grammars 230. However, let it also be assumed that the third candidate 343 did match a given grammar from the plurality of grammars 230. As a result, the server 106 may be configured to execute an action 382 associated with the given grammar from the plurality of grammars 230 which has been matched against the third candidate 343 in order to satisfy the intent of the user 102.

In some embodiments of the present technology, upon more than one candidate from the plurality of candidates matching with grammars from the plurality of grammars 230, the server 106 may be configured to select which action amongst the corresponding so-matched grammars is to be executed in order to satisfy the intent of the user 102. To that end, in some embodiments, the database 124 may be configured to store a skill prioritization list that lists various skills of the IPA processing system 108 in a pre-determined prioritization order. Thus, the server 106 may access the database 124 and determine that an action associated with a mot prioritized grammar amongst the so-matched grammars is to be executed for satisfying the intent of the user 102.

In some embodiments of the present technology, it should be noted that for the server 106 to be configured to generate the plurality of candidate textual representations 340 based on the textual representation 260, the server 106 may be configured to generate at least one candidate textual representation missing the nonce word from the words thereof, and at least one candidate textual representations having the non-normalized word from the words thereof replaced by a normalized version thereof. In at least some embodiments, at least one candidate textual representation may be missing the nonce word from the words of the textual representation 260 and the non-normalized word from the words of the textual representation 260 thereof replaced by a normalized version thereof.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of processing a spoken utterance associated with a user, the method executable by an electronic device, the electronic device executing a Machine Learned Algorithm (MLA) for performing automatic speech recognition of the spoken utterance, the electronic device having access to a plurality of grammars, a given one of the plurality of grammars being representative of a respective user intent and associated with an action, the method comprising:
   acquiring, by the electronic device, an indication of the spoken utterance;
   generating, by the electronic device using the MLA, a textual representation of the spoken utterance having words;
   identifying, by the electronic device, a nonce word and a non-normalized word amongst the words,
   generating, by the electronic device, a plurality of candidate textual representations based on the textual representation,
      the plurality of candidate textual representations having at least one of a first set of candidate textual representations and a second set of candidate textual representations,
         candidate textual representations from the first set missing the nonce word from the words of the textual representation,
         candidate textual representations from the second set having the non-normalized word from the words of the textual representation replaced by a normalized version thereof;
   comparing, by the electronic device, the plurality of candidate textual representations against one of the plurality of grammars; and
   in response to a given candidate textual representation matching the one of the plurality of grammars, triggering, by the electronic device, an action associated with the one of the plurality of grammars.

2. The method of claim 1, wherein the first set and the second set at least partially overlap.

3. The method of claim 2, wherein both the first set and the second set include at least one common textual representation having the words from the textual representation (i) except for the nonce word and where (ii) the non-normalized word is replaced by the normalized version thereof.

4. The method of claim 1, wherein the generating the plurality of candidate textual representations comprises:
   generating, by the electronic device, a graph-structure having nodes connected by edges, a given sequence of edges being representative of a respective one from the plurality of candidate textual representations,
      the words from the textual representation being associated with respective edges from the graph-structure,
         the nonce word being associated with (i) a first edge indicative of a presence of the nonce word in a given candidate textual representation represented by a sequence of edges including the first edge, and (ii) a second edge indicative of an absence of the nonce word in a given candidate textual representation represented by a sequence of edges including the second edge;
         the non-normalized word being associated with (i) a third edge indicative of a presence of the non-normalized word in a given candidate textual representation represented by a sequence of edges including the third edge, and (ii) a fourth edge indicative of a presence of the normalized version thereof in a given candidate textual representation represented by a sequence of edges including the fourth edge.

5. The method of claim 4, wherein the comparing the plurality of candidate textual representations comprises:
   accessing, by the electronic device, the graph-structure for identifying a first candidate textual representation based on a first sequence of edges; and
   comparing, by the electronic device, the first candidate textual representation against at least one of the plurality of grammars.

6. The method of claim 1, wherein the identifying the nonce word amongst the words comprises:
   inputting, by the electronic device, the textual representation into a Neural Network (NN) configured to generate label data for the words from the textual representation, the label data being indicative of which words amongst the words from the textual representation are nonce words.

7. The method of claim 1, wherein the identifying the non-normalized word amongst the words comprises:
   comparing, by the electronic device, the words from the textual representation against a list of pre-determined words, a given pre-determined word in the list being a non-normalized word and associated with a normalized version thereof; and
   in response to a given word from the words of the textual representation matching a given pre-determined word from the list,
      generating, by the electronic device, label data for the given word, the label data being indicative of (i) the given word being the non-normalized word and (ii) the non-normalized version thereof.

8. The method of claim 1, wherein the first set of candidate textual representations comprises a single member.

9. The method of claim 1, wherein the second set of candidate textual representations comprises a single member.

10. The method of claim 1, wherein the electronic device is a server communicatively coupled with a user device.

11. The method of claim 1, wherein the electronic device is a user device of the user.

12. A method of processing a spoken utterance associated with a user, the method executable by an electronic device, the electronic device executing a Machine Learned Algorithm (MLA) for performing automatic speech recognition of the spoken utterance, the electronic device having access to a plurality of grammars, a given one of the plurality of grammars being representative of a respective user intent and associated with an action, the method comprising:
   acquiring, by the electronic device, an indication of the spoken utterance;
   generating, by the electronic device using the MLA, a textual representation of the spoken utterance having words;

identifying, by the electronic device, a nonce word and a non-normalized word amongst the words, generating, by the electronic device, a plurality of candidate textual representations based on the textual representation, the generating including generating:

at least one candidate textual representation missing the nonce word from the words thereof, at least one candidate textual representations having the non-normalized word from the words thereof replaced by a normalized version thereof;

comparing, by the electronic device, the plurality of candidate textual representations against one of the plurality of grammars; and in response to a given candidate textual representation matching the one of the plurality of grammars, triggering, by the electronic device, an action associated with the one of the plurality of grammars.

13. The method of claim 12, wherein the plurality of candidate textual representations further comprises:

at least one candidate textual representation missing the nonce word from the words of the textual representation and the non-normalized word from the words of the textual representation replaced by a normalized version thereof.

14. An electronic device for processing a spoken utterance associated with a user, the electronic device executing a Machine Learned Algorithm (MLA) for performing automatic speech recognition of the spoken utterance, the electronic device having access to a plurality of grammars, a given one of the plurality of grammars being representative of a respective user intent and associated with an action, the electronic device being configured to:

acquire an indication of the spoken utterance;

generate, using the MLA, a textual representation of the spoken utterance having words;

identify a nonce word and a non-normalized word amongst the words, generate a plurality of candidate textual representations based on the textual representation, the plurality of candidate textual representations having at least one of a first set of candidate textual representations and a second set of candidate textual representations, candidate textual representations from the first set missing the nonce word from the words of the textual representation, candidate textual representations from the second set having the non-normalized word from the words of the textual representation replaced by a normalized version thereof;

compare the plurality of candidate textual representations against one of the plurality of grammars; and in response to a given candidate textual representation matching the one of the plurality of grammars, trigger an action associated with the one of the plurality of grammars.

15. The electronic device of claim 14, wherein the first set and the second set at least partially overlap.

16. The electronic device of claim 15, wherein both the first set and the second set include at least one common textual representation having the words from the textual representation (i) except for the nonce word and where (ii) the non-normalized word is replaced by the normalized version thereof.

17. The electronic device of claim 14, wherein the electronic device configured to generate the plurality of candidate textual representations comprises the electronic device configured to:

generate a graph-structure having nodes connected by edges, a given sequence of edges being representative of a respective one from the plurality of candidate textual representations, the words from the textual representation being associated with respective edges from the graph-structure, the nonce word being associated with (i) a first edge indicative of a presence of the nonce word in a given candidate textual representation represented by a sequence of edges including the first edge, and (ii) a second edge indicative of an absence of the nonce word in a given candidate textual representation represented by a sequence of edges including the second edge;

the non-normalized word being associated with (i) a third edge indicative of a presence of the non-normalized word in a given candidate textual representation represented by a sequence of edges including the third edge, and (ii) a fourth edge indicative of a presence of the normalized version thereof in a given candidate textual representation represented by a sequence of edges including the fourth edge.

18. The electronic device of claim 17, wherein the electronic device configured to compare the plurality of candidate textual representations comprises the electronic device being configured to:

access the graph-structure for identifying a first candidate textual representation based on a first sequence of nodes; and compare the first candidate textual representation against at least one of the plurality of grammars.

19. The electronic device of claim 14, wherein the electronic device configured to identify the nonce word amongst the words comprises the electronic device configured to:

input the textual representation into a Neural Network (NN) configured to generate label data for the words from the textual representation, the label data being indicative of which words amongst the words from the textual representation are nonce words.

20. The electronic device of claim 14, wherein the electronic device configured to identify the non-normalized word amongst the words comprises the electronic device configured to:

compare the words from the textual representation against a list of pre-determined words, a given pre-determined word in the list being a non-normalized word and associated with a normalized version thereof; and in response to a given word from the words of the textual representation matching a given pre-determined word from the list, generate label data for the given word, the label data being indicative of (i) the given word being the non-normalized word and (ii) the non-normalized version thereof.

* * * * *